Nov. 2, 1954          E. A. HENRY          2,693,106

RESONANCE DEVICE FOR INSPECTING MATERIALS

Filed June 22, 1951          3 Sheets-Sheet 1

INVENTOR.
ELLIOTT A. HENRY
BY
Joseph H. Lipschutz
ATTORNEY

Nov. 2, 1954     E. A. HENRY     2,693,106
RESONANCE DEVICE FOR INSPECTING MATERIALS
Filed June 22, 1951     3 Sheets-Sheet 2

INVENTOR.
ELLIOTT A. HENRY
BY
*Joseph H. Lipschutz*
ATTORNEY

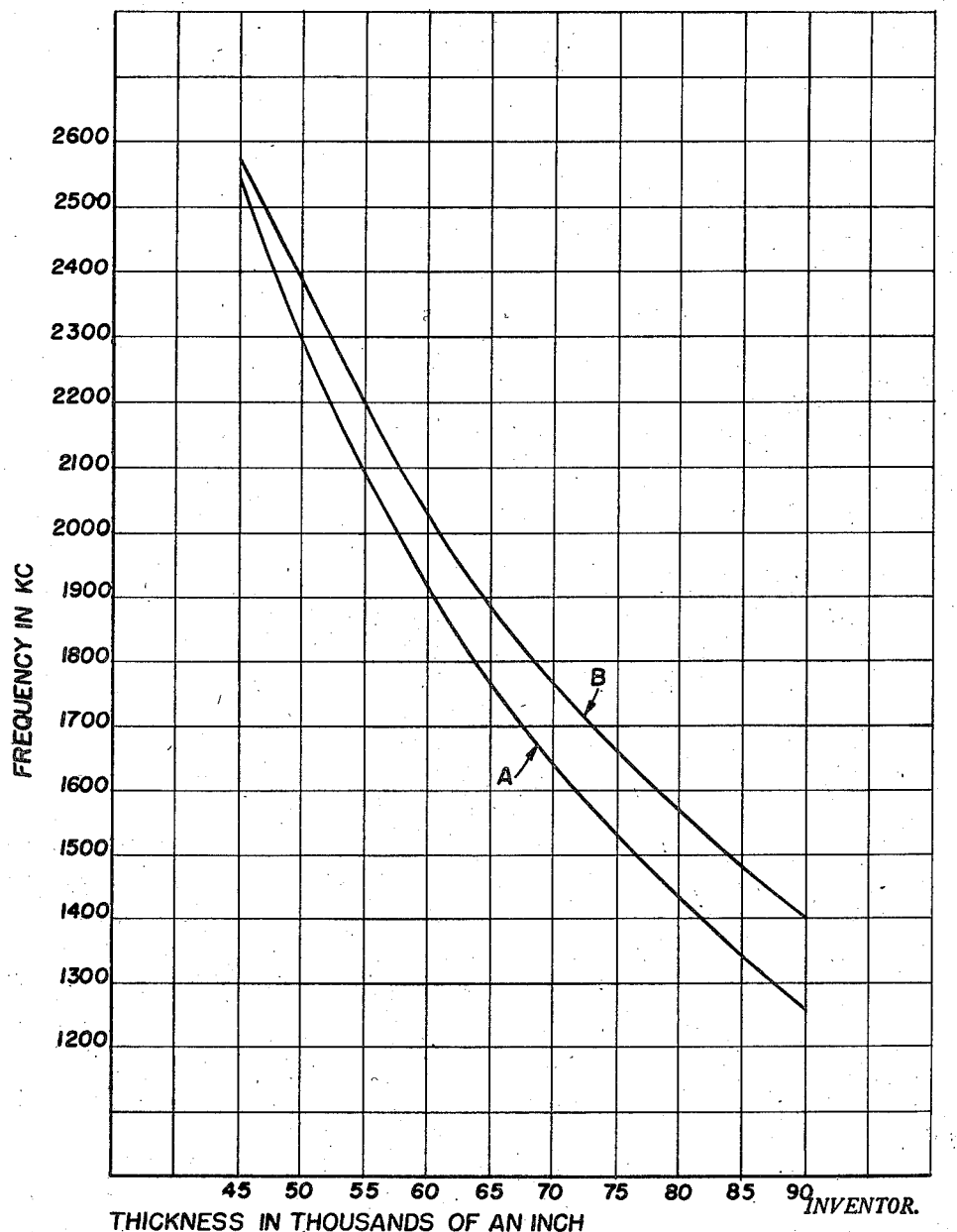

United States Patent Office 2,693,106
Patented Nov. 2, 1954

2,693,106

RESONANCE DEVICE FOR INSPECTING MATERIALS

Elliott A. Henry, Bridgeport, Conn., assignor to Sperry Products, Inc., Danbury, Conn., a corporation of New York Application June 22, 1951, Serial No. 233,071

3 Claims. (Cl. 73—67)

This invention relates to the transfer of ultrasonic energy into a work piece. More particularly the invention relates to devices such as disclosed in the patent to Rassweiler and Erwin No. 2,431,234, granted November 18, 1947, which devices have as their object to indicate the resonant frequency as a measure of the thickness of the work piece. The theory underlying these devices is that the thickness of the work piece is one-half the wave length at the resonant frequency, at which time maximum energy is supposed to be transferred into the work piece. This is the calculated resonant frequency.

In practice the actual frequency at which resonance is indicated has been found to differ from the calculated resonance frequency, and this deviation increased as the thickness of the work piece increased and the frequency of the applied energy decreased. Such deviation resulted in a diminution of sensitivity of energization because the apparent resonant frequency not being the true resonant frequency, the maximum sensitivity of energization was not obtained.

It is therefore the principal object of this invention to provide means for insuring constant sensitivity of amplification of the resonant frequency signal voltage throughout the frequency range.

Further objects and advantages of this invention will become apparent in the following detailed description thereof.

In the accompanying drawings,

Fig. 3 is a graph illustrating the theory underlying this invention.

Figure 1:
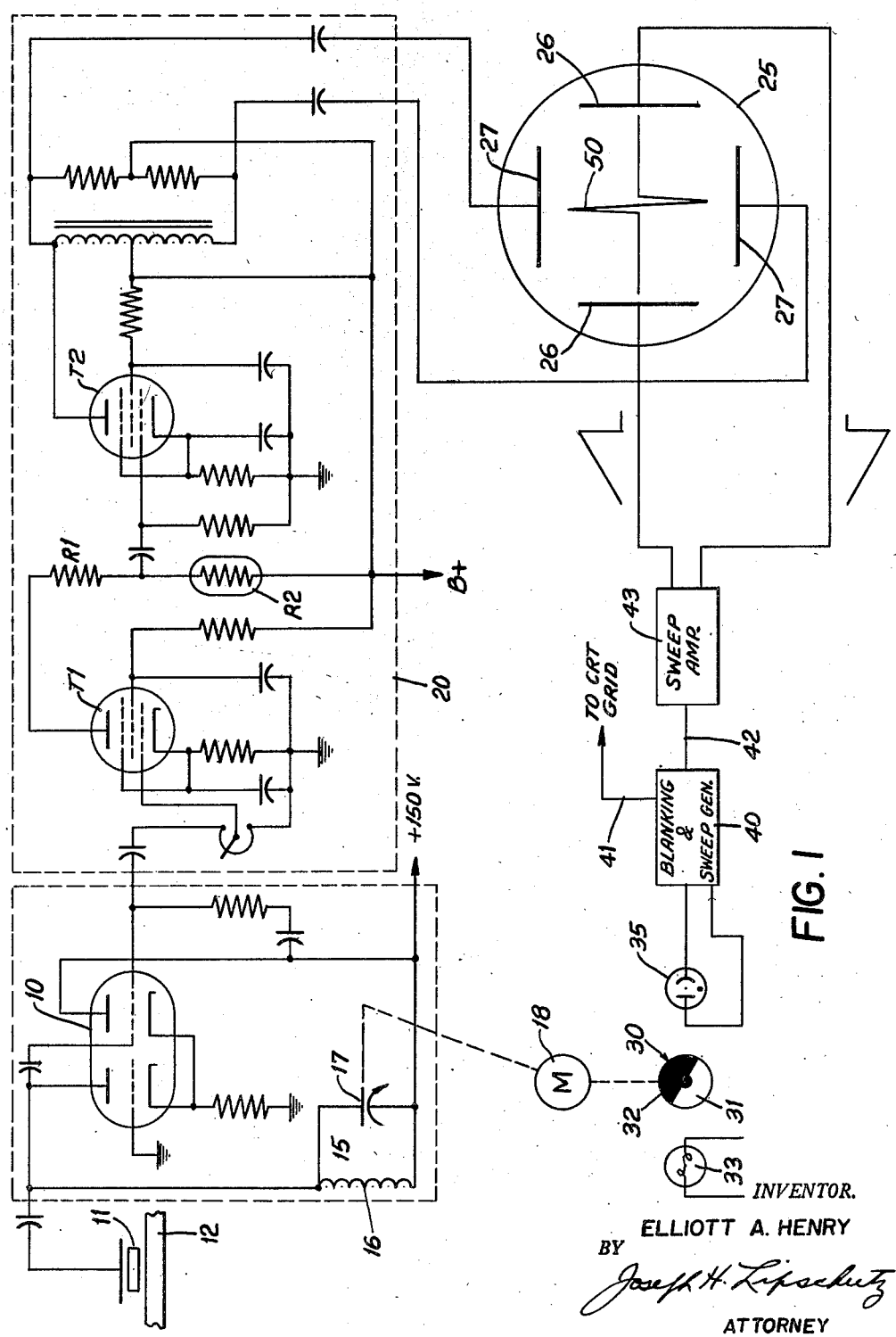
Fig. 1 is a wiring diagram embodying one form of the invention.

Referring to Fig. 1, there is disclosed an oscillation generator 10 for energizing a piezo-electric element which may be in the form of a quartz crystal 11 which transforms the electrical oscillations into mechanical oscillations and transmits the mechanical oscillations to work piece 12. The oscillation generator shown is of the type disclosed in U. S. Patent No. 2,269,417 to Murray G. Crosby, granted January 6, 1942. The oscillatory circuit includes a tank circuit 15 comprising an inductance 16 and a variable capacitor 17, the latter being designed to be continuously varied through a predetermined range by means of a motor 18. As the capacitance of capacitor 17 is varied the frequency of the circuit is varied. When a frequency is reached such that the thickness of the work piece equals one-half the wave length, a resonant condition will exist at which time maximum power will theoretically be transferred into the work piece. At the resonance frequency maximum current will suddenly be drawn from the oscillatory circuit and this rapid change in current flow after being suitably amplified by a signal amplifier 20 may be indicated on any appropriate instrument, such as, for example, oscilloscope 25 having a sweep between horizontal plates 26, the signal being applied to vertical plates 27. In order to synchronize the sweep with the frequency range the motor 18 which drives capacitor 17 also drives a shutter 30 having a light-transmitting portion 31 and an opaque portion 32, designed to transmit and cut off light from a suitable source such as lamp 33 from a photo-electric tube 35. The shutter is so positioned as to pass light for the interval that the capacitor 17 is operating through the desired angular distance to provide the desired frequency range. During this interval the light will energize the photoelectric tube 35 to cause current to flow and energize a blanking and sweep generator 40 whose output 41 energizes the grid (not shown) of cathode ray tube (oscilloscope) 25 and whose output 42 after being amplified by a sweep amplifier 43 triggers the sweep on the oscilloscope. Thus the sweep is synchronized with the movement of the capacitor through the desired range of test frequencies. When resonance is apparently established a sharp indication such as 50 will appear on the screen and the position of this indication along the sweep is a function of the frequency and therefore may be an indication of the thickness of the work piece.

As hereinbefore stated, the calculated resonance frequency of any work piece 12 occurs when the thickness of the work piece is one-half of the wave length. Thus referring to Fig. 3, it will be seen that curve A indicates the calculated resonance frequencies for various thicknesses of work pieces. Thus for example for a steel work piece .080" thick the calculated resonance frequency would be 1430 kc. However in utilizing a device such as disclosed by Rassweiler and Erwin in their Patent No. 2,431,234, it has been found that the indicated resonance occurred at a substantially higher frequency. Thus for the steel work piece of .080" thickness the indicated resonance is 1585 kc., using a crystal having a natural frequency of approximately 2800 kc. for the indicated range in accordance with the teachings of Rassweiler and Erwin. The indicated resonance frequency thus deviates from the calculated resonance frequency by an excess 155 kc. From the two curves A and B it will be seen that as the thickness of a work piece increases the deviation between calculated resonance frequency and indicated resonance frequency increases. This deviation indicates that the capacitive reactance of the transducer has increased as the frequency of oscillation deviated from the natural frequency of the crystal because the capacitive reactance of the crystal increases with decrease in frequency when driven at a frequency lower than its natural frequency. Thus, if at the smaller thicknesses the resonance frequency of the work piece is close to the natural frequency of the crystal, there will be but a slight deviation as indicated in Fig. 3 for a work piece of .045" thickness. However as the thickness of the work piece increases and the resonance frequency decreases the crystal is operating further and further below its natural frequency and therefore there is increasing capacitive reactance of the crystal the further from its natural frequency that it is operated.

The load on the oscillator comprises the transducer and the work piece, and since this combination has a capacitive reactance, the oscillator tank circuit must have an inductive reactance equal in magnitude to the capacitive reactance of the load, in order to deliver maximum power. In order for the oscillator tank circuit to exhibit an inductive reactance it must be tuned to a higher frequency because of the capacitive reactance of the load. This accounts for the indicated resonance frequency being higher than the calculated resonance frequency of a test piece of given thickness. This deviation from calculated resonance frequency means that the theoretical maximum power is not being transferred into the work piece. The lower the frequency the greater the deviation and the greater the diminution of theoretical power transfer.

Under the above-described conditions, there is a loss of power transmitted by the transducer to the work piece. This loss of power is the difference between the power which the transducer would transmit at the calculated resonance frequency (curve A) and the power which it actually transmits at the apparent resonance frequency (curve B). This loss increases as the frequency decreases, and the input voltage to the amplifier is correspondingly decreased, resulting in a decreased output signal voltage from the amplifier to the oscilloscope. Therefore, to compensate for this loss the gain of the amplifier is increased as the frequency is decreased so that a constant output signal voltage from the amplifier will be delivered to the oscilloscope at resonant frequencies throughout the frequency range.

The method disclosed in Fig. 1 consists in providing the signal voltage amplifier 20 with a non-linear characteristic whereby the amplifier gain is an inverse function of the input signal voltage. Thus as the amplifier input signal voltage decreases with decrease in frequency, the amplifier gain will be correspondingly increased to yield substantially uniform sensitivity over the entire range of frequencies. For this purpose I provide a non-linear resistance R2 as a portion of the total load resistor (R1—R2) of the first signal amplifier tube T1. Such a non-linear resistance may be silicon carbide with a ceramic binder, commonly know as Thyrite, and characterized by the fact that its resistance is an inverse function of the voltage impressed across it, the resistance decreasing as the voltage increases. Thus, as the frequency decreases and the signal input voltage to the amplifier decreases, the voltage impressed on resistor R2 decreases. This results in an increasing voltage drop across resistor R2, and therefore the signal voltage impressed on the grid of the second amplifier tube T2 will be proportionately greater for a low amplitude signal voltage input than for a large amplitude signal voltage input. Therefore, the overall sensitivity of the amplifier will be substantially uniform over a wide range of frequencies impressed by the oscillator on the object under inspection and the amplifier will deliver a substantially constant signal voltage to the oscilloscope at resonant frequencies throughout said range.

Figure 2:
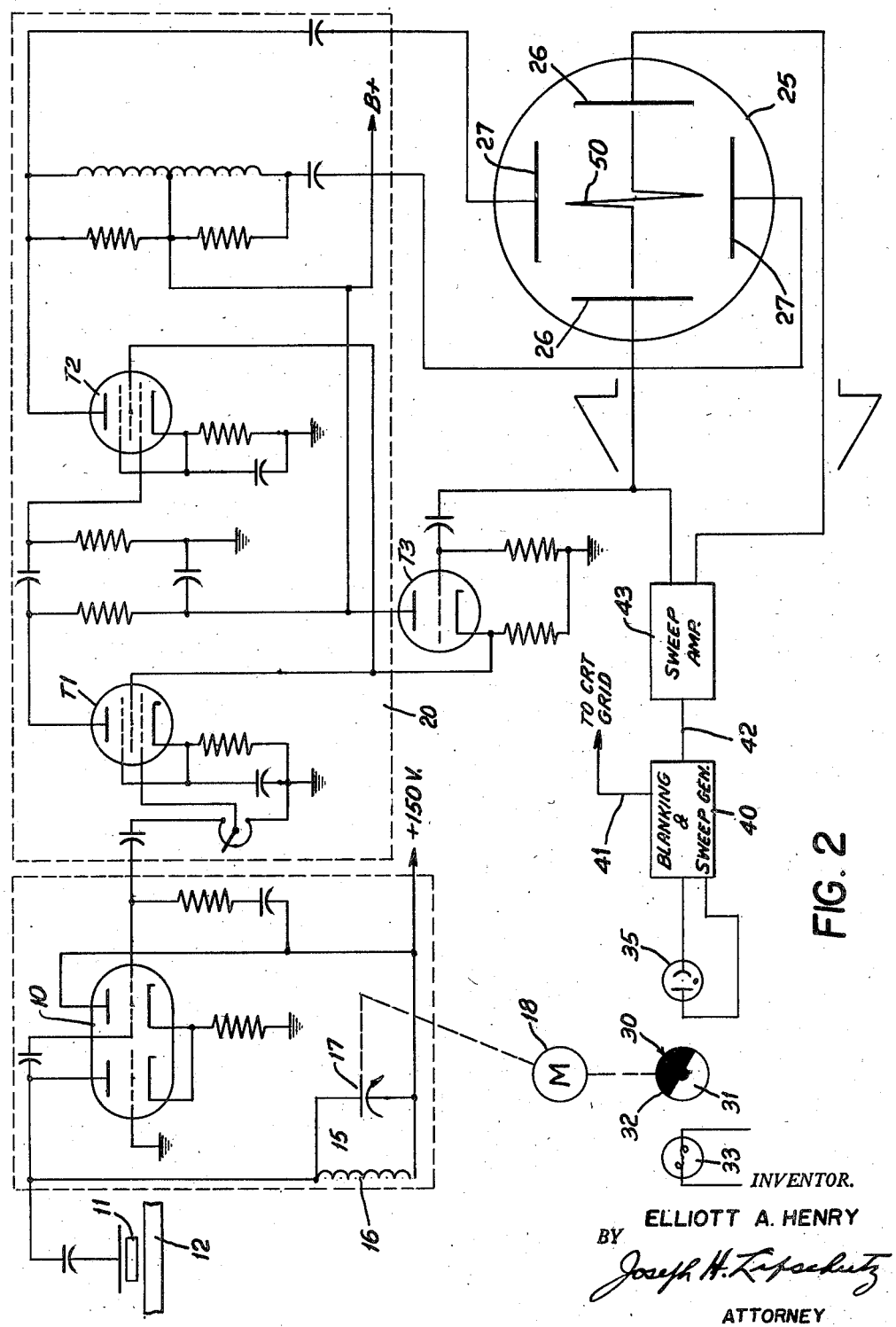
Fig. 2 is a view similar to Fig. 1 embodying another form of the invention.

A second method for accomplishing the same result, i. e., substantially uniform overall sensitivity of the amplifier over a wide range of impressed frequencies, is disclosed in Fig. 2. In this form of the invention a gated amplifier is used wherein the sensitivity of the amplifier is made a function of the angular displacement of the tuning capacitor or frequency control by causing the screen grid voltage on two screen grid amplifier tubes T1 and T2 to rise in proportion to the angular displacement as the frequency range moves from high to low. Thus the lower the frequency, the higher the amplifier gain to give a substantially uniform overall sensitivity over the entire range of frequencies. For this purpose the screen grids of tubes T1 and T2 are connected in parallel and to the cathode of tube T3 which is a cathode follower driven by the positive going sweep voltage. It will be seen that at the time $t_0$ when the sweep is commencing, the screen grid voltage of tubes T1 and T2 will be very low and hence, the amplifier sensitivity will be low. As the capacitor rotates, the deflection or sweep voltage increases, and hence the cathode voltage of tube T3 also rises, resulting in increases in screen grid voltages in tubes T1 and T2 and corresponding increases in amplifier sensitivity. At the end of the sweep the sweep voltage drops to its minimum value and remains there until the start of the succeeding cycle.

Another advantage of the above described system is to be found in insuring that the amplitude of the resonant frequency signal will always be greater in magnitude than the second harmonic of the common mode resonance which occurs when intimate contact between the crystal and the work causes them to vibrate as a unit. The spurious signal occurs at a frequency approximately equivalent to one-half the total thickness of crystal and work piece. It frequently occurred that the spurious signal caused by this second harmonic exceeded in magnitude the true signal. However, by this method where more power is delivered to the work piece at the true resonant frequency, the true signal will always exceed in magnitude the spurious signal.

Having described my invention, what I claim and desire to secure by Letters Patent is:

1. In a device for transmitting ultrasonic power into a work piece at its resonant frequency, means for generating electrical oscillations, a piezo-electric transducer engaging said work piece and energized by said oscillations for transforming said electrical oscillations into mechanical oscillations, means for varying the frequency of said oscillations through a predetermined range where the reactance of the transducer increases as the frequency of said oscillations deviates from the natural frequency of the transducer to cause diminution of transfer of ultrasonic power into the work piece, an amplifier responsive to the power transferred into the work piece, and means for varying the gain of said amplifier as a function of the deviation of the frequency of maximum power transfer from the true resonant frequency to maintain constant the sensitivity of the amplifier to resonant responses of work pieces having different resonant frequencies.

2. In a device for transmitting ultrasonic power into a work piece at its resonant frequency, means for generating electrical oscillations, a piezo-electric transducer engaging said work piece and energized by said oscillations for transforming said electrical oscillations into mechanical oscillations, means for varying the frequency of said oscillations through a predetermined range where the reactance of the transducer increases as the frequency of said oscillations deviates from the natural frequency of the transducer to cause diminution of transfer of ultrasonic power into the work piece, an amplifier responsive to the power transferred into the work piece, and means for varying the gain of said amplifier as an inverse function of the deviation of the frequency of maximum power transfer from the true resonant frequency to maintain constant the sensitivity of the amplifier to resonant responses of work pieces having different resonant frequencies.

3. In a device for transmitting ultrasonic power into a work piece at its resonant frequency, means for generating electrical oscillations, a piezo-electric transducer engaging said work piece and energized by said oscillations for transforming said electrical oscillations into mechanical oscillations, means for varying the frequency of said oscillations through a predetermined range where the reactance of the transducer increases as the frequency of said oscillations deviates from the natural frequency of the transducer to cause diminution of transfer of ultrasonic power into the work piece, an amplifier responsive to the power transferred into the work piece, and means for varying the gain of said amplifier as an inverse function of the deviation of the frequency of maximum power transfer from the true resonant frequency to maintain constant the sensitivity of the amplifier to resonant responses of work pieces having different resonant frequencies, said amplifier gain varying means including a tube having anode, cathode and grid, a load resistor for the tube, said resistance being of the type whose resistance is an inverse function of the voltage impressed across it, and a second tube having anode, cathode and grid, said resistance controlling the voltage impressed on the grid of the second tube.

References Cited in the file of this patent

UNITED STATES PATENTS

| Number | Name | Date |
| --- | --- | --- |
| 2,400,796 | Watts et al. | May 21, 1946 |
| 2,431,234 | Rassweiler et al. | Nov. 18, 1947 |
| 2,498,381 | Smith | Feb. 21, 1950 |